(12) United States Patent
Klein et al.

(10) Patent No.: US 11,513,891 B2
(45) Date of Patent: Nov. 29, 2022

(54) SYSTEMS AND METHODS FOR PARITY-BASED FAILURE PROTECTION FOR STORAGE DEVICES

(71) Applicant: Kioxia Corporation, Tokyo (JP)

(72) Inventors: Yaron Klein, Tel Aviv (IL); Krishna R. Malakapalli, San Jose, CA (US); Jeremy Werner, San Jose, CA (US)

(73) Assignee: KIOXIA CORPORATION, Tokyo (JP)

( * ) Notice: Subject to any disclaimer, the term of this patent is extended or adjusted under 35 U.S.C. 154(b) by 40 days.

(21) Appl. No.: 17/020,158

(22) Filed: Sep. 14, 2020

(65) Prior Publication Data
US 2022/0027233 A1    Jan. 27, 2022

Related U.S. Application Data

(60) Provisional application No. 63/056,411, filed on Jul. 24, 2020.

(51) Int. Cl.
| | | |
|---|---|---|
| G06F 11/10 | (2006.01) | |
| G06F 3/06 | (2006.01) | |
| G06F 9/30 | (2018.01) | |
| G06F 11/30 | (2006.01) | |

(52) U.S. Cl.
CPC ........ G06F 11/1068 (2013.01); G06F 3/0619 (2013.01); G06F 3/0656 (2013.01); G06F 3/0659 (2013.01); G06F 3/0688 (2013.01); G06F 9/30029 (2013.01); G06F 11/3037 (2013.01)

(58) Field of Classification Search
CPC .. G06F 11/1068; G06F 3/0619; G06F 3/0656; G06F 3/0659; G06F 3/0688; G06F 9/30029; G06F 11/3037

USPC ......................................... 714/763, 764, 768
See application file for complete search history.

(56) References Cited

U.S. PATENT DOCUMENTS

| | | | | |
|---|---|---|---|---|
| 6,012,123 | A * | 1/2000 | Pecone | G06F 11/1076 |
| | | | | 711/111 |
| 11,175,984 | B1 * | 11/2021 | Lercari | G06F 11/0784 |
| 2013/0311822 | A1 * | 11/2013 | Kotzur | G06F 11/0757 |
| | | | | 714/6.22 |
| 2015/0178151 | A1 * | 6/2015 | Li | H03M 13/118 |
| | | | | 714/758 |

(Continued)

FOREIGN PATENT DOCUMENTS

| | | |
|---|---|---|
| TW | 201923575 A | 6/2019 |
| TW | 201928958 A | 7/2019 |

(Continued)

OTHER PUBLICATIONS

Taiwan Office Action and Search Report on TW 110126266 dated Mar. 9, 2022; 5 pages.p.

*Primary Examiner* — Kyle Vallecillo
(74) *Attorney, Agent, or Firm* — Foley & Lardner LLP

(57) ABSTRACT

Various implementations described herein relate to systems and methods for providing data protection and recovery for drive failures, including receiving, by a storage device, a write request from a host operatively coupled to a storage device, and determining, by the storage device instead of the host, an XOR result by performing an XOR operation of new data and existing data. The new data is received from the host. The existing data is stored in the non-volatile storage.

20 Claims, 7 Drawing Sheets

(56) References Cited

U.S. PATENT DOCUMENTS

| | | | | |
|---|---|---|---|---|
| 2016/0299724 A1* | 10/2016 | Vanaraj | ............... | G06F 11/1076 |
| 2019/0034306 A1* | 1/2019 | Wysocki | .............. | G06F 11/2094 |
| 2020/0210090 A1* | 7/2020 | Darisa | ................... | G06F 3/0688 |
| 2021/0096780 A1* | 4/2021 | Kotzur | .................. | G06F 3/0619 |

FOREIGN PATENT DOCUMENTS

| | | |
|---|---|---|
| TW | 202011187 A | 3/2020 |
| TW | 202018505 A | 5/2020 |

* cited by examiner

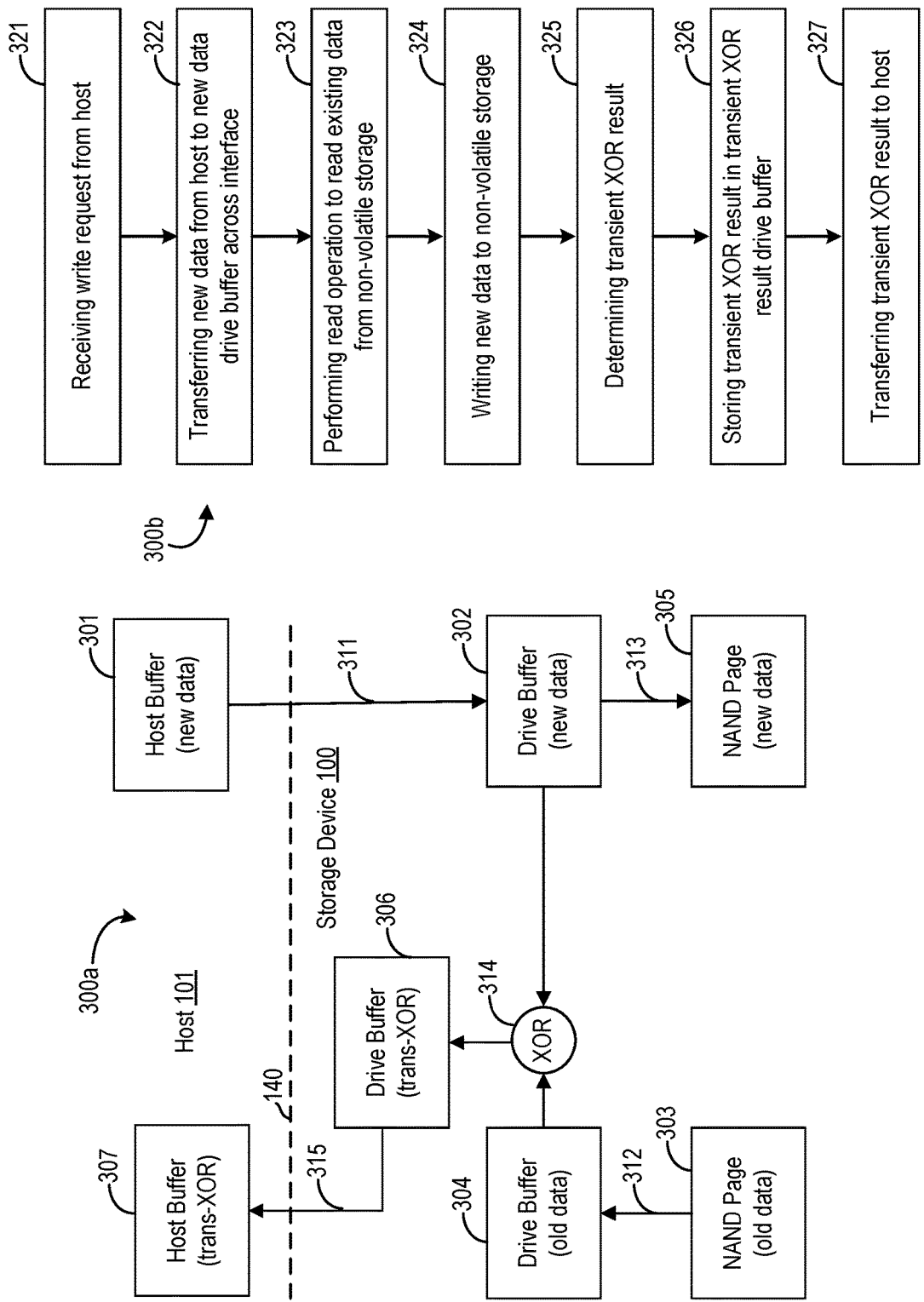

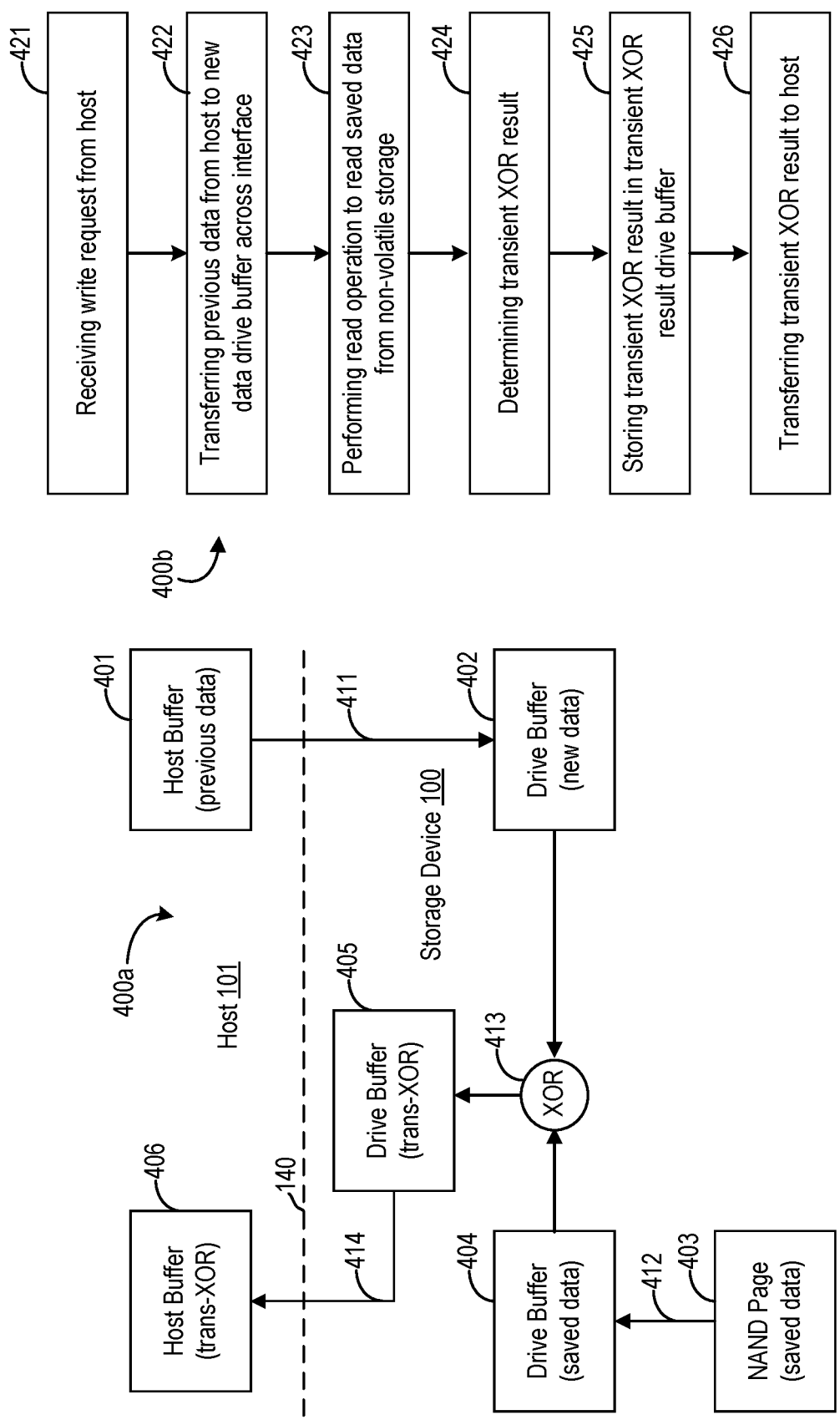

SYSTEMS AND METHODS FOR PARITY-BASED FAILURE PROTECTION FOR STORAGE DEVICES

RELATED APPLICATION

This application claims priority to U.S. Provisional Patent Application No. 63/056,411, filed on Jul. 24, 2020, the entire content of which is fully incorporated herein by reference.

TECHNICAL FIELD

The present disclosure generally relates to systems, methods, and non-transitory processor-readable media for data protection and recovery for drive failures in data storage devices.

BACKGROUND

Redundant Array of Inexpensive Drives (RAID) can be implemented on non-volatile memory device based drives to achieve protection from drive failures. Various forms of RAID can be broadly categorized based on whether data is being replicated or parity protected. Replication is more expensive in terms of storage cost because replication doubles the number of devices needed.

On the other hand, parity protection typically require storage cost lower than that of replication. In the example of RAID 5, one additional device is needed to provide protection for a single device failure at a given time by holding parity data for a minimum of two data devices. When RAID 5 parity protection is employed, the additional storage cost as a percentage of the total cost is typically reduced as the number of devices being protected in a RAID group increases.

In the case of RAID 6, which offers protection for up to two devices failing at the same time, two additional devices are needed to hold parity data for a minimum of two data devices. Similarly, when RAID 6 parity protection is employed, the additional storage cost as a percentage of the total cost is reduced as the number of devices being protected in a RAID group increases. To alleviate the risk of failure of the drives holding the parity data, the drives on which the parity data is stored are rotated.

Other variations of parity protection include combining replication with parity protection (e.g., as in RAID 51 and RAID 61), to vary the stripe sizes used between devices to match a given application, and so on.

SUMMARY

In some arrangements, a storage device includes a non-volatile storage and a controller configured to receive a write request from a host operatively coupled to the storage device and determine an XOR result by performing an XOR operation of new data and existing data. The new data is received from the host. The existing data is stored in the non-volatile storage.

In some arrangements, a method includes receiving, by a controller of a storage device operatively coupled to a host through an interface, a write request from the host and determining, by the controller, an XOR result by performing an XOR operation of new data and existing data. The new data is received from the host. The existing data is stored in the non-volatile storage.

In some arrangements, a non-transitory computer-readable media including computer-readable instructions, such that, when executed, causes a processor to receive a write request from a host operatively coupled to the storage device and determine an XOR result by performing an XOR operation of new data and existing data, the new data is received from the host, and the existing data is stored in the non-volatile storage.

BRIEF DESCRIPTION OF THE FIGURES

FIG. 3A is a block diagram illustrating an example method for performing data update, according to some implementations.

FIG. 3B is a flowchart diagram illustrating an example method for performing data update, according to some implementations.

FIG. 4A is a block diagram illustrating an example method for performing data recovery, according to some implementations.

FIG. 4B is a flowchart diagram illustrating an example method for performing data recovery, according to some implementations.

DETAILED DESCRIPTION

Figure 1:
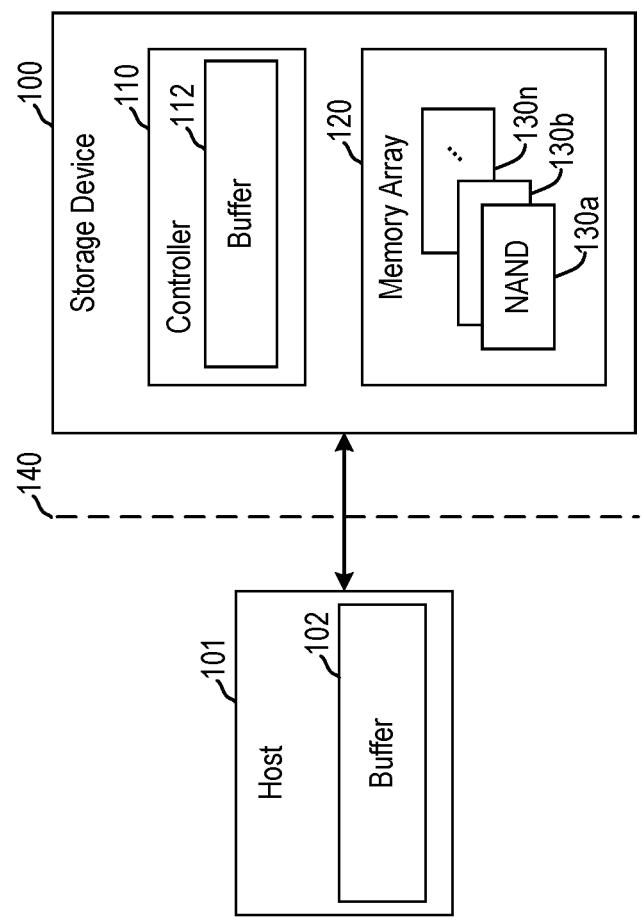
FIG. 1 shows a block diagram of examples of a system including a storage device and a host, according to some implementations.

Various challenges face parity-based protection. Presently, a vast majority of implementations is achieved through a dedicated Disk Array Controller (DAC). The DAC computes the parity data by performing an exclusive-or (XOR) of each stripe of data per data disk in a given RAID group and stores the resulting parity data on one or more parity disks. The DAC is typically attached to a main Central Processing Unit (CPU) over a Peripheral Component Interconnect Express (PCIe) bus or network, while the DAC uses storage-specialized interconnects and protocols (interfaces) such as but not limited to, AT Attachment (ATA), Small Computer System Interface (SCSI), Fibre Channel, and Serial Attached SCSI (SAS) to connect and communicate with the disks. With the storage-specialized interconnects, the dedicated hardware controller had been needed to translate between a PCIe bus and the storage interfaces like SCSI or Fibre Channel.

Applicant has recognized that the evolution of non-volatile memory based storage devices such as Solid State Drives (SSDs) has fundamentally changed the system architecture in that storage devices are attached directly onto the PCIe bus over a Non-Volatile Memory Express (NVMe) interface, thus eliminating inefficiencies in the path and optimizing cost, power, and performance. Although the functionalities of the DAC is still needed for SSD failure protection, the DAC functionality is migrating from being a dedicated hardware controller to software running on a general purpose CPU.

With access times in Hard Disk Drives (HDDs) being in the order of milliseconds, DAC inefficiencies were not exposed. Emergence of SSDs has reduced data access times, thus placing much stringent requirements onto the DAC to export and aggregate performance of a multitude of SSDs. Applicant recognizes that as access times with SSDs decreased by orders of magnitude into 10s of microseconds, the convention implementations of the DAC become inefficient as performance of the DAC translates to the performance of SSDs.

Due to the rise of NVMe, the interfaces used for HDDs need to be upgraded to be compatible with SSDs. Such interfaces define the manner in which commands are delivered, status is returned, and data exchanged between a host and the storage device. The interfaces can optimize and streamline connection directly to the CPU without being bogged down by an intermediary interface translator.

Furthermore, the cost of HDDs (per GB) have been reduced significantly as SSD adoption began to increase, partly due to improved capacity have been provided in HDD each disk to differentiate over SSDs in the marketplace. However, improved capacity came at the cost of performance. Consequently, DAC vendors moved from using parity-based protection to replication-based protection for HDDs. The data storage and access times of the HDDs had been slower than those of the SSDs, thus packing more capacity made average performance of HDDs worse. In that regard, DAC vendors did not want to slow down the HDD any further by using parity-based protection. Thus, replication-based protection has become pervasively used almost de facto in standard DACs for HDDs. When SSDs came along with requirements in the orders of magnitude improvement greater for the DAC to address, it was opportunistic and timely for DAC to simply reuse replication-based protection for SSDs, as well.

Accordingly, parity-based protection for SSDs has not kept up with architectural changes that were taking place system-wide. In addition, a cost barrier and access barrier were also erected on main CPUs in the form of special Stock Keeping Units (SKUs) with limited availability to select customers. DAC vendors lost the same freedom to offer parity-based protection for SSDs as the DAC vendors have for replication-based SSDs.

As a result, implementing RAID 5 and RAID 6 parity-based protection for SSDs has become even more difficult to implement.

Conventionally, RAID (e.g., RAID 5 and RAID 6) redundancy is created for storage devices (e.g., SSDs) by relying upon the host to perform the XOR computations and updating the parity data on SSDs. The SSDs perform their usual function of reading or writing data to and from the storage media (e.g., the memory array) unaware of whether data is parity data or not. Thus, in RAID 5 and RAID 6, the computational overhead and the extra data generation and movement often become the performance bottleneck over the storage media.

The arrangements disclosed herein relate to parity-based protection schemes that are cost-effective solutions for SSD failure protection without compromising the need to deliver to business needs faster. The present disclosure addresses challenges relative to parity-based protection while creating solutions that are in tune with the current system architecture and evolving changes. In some arrangements, the present disclosure relates to cooperatively performing data protection and recovery operations between two or more elements of a storage system. While non-volatile memory devices are presented as examples herein, the disclosed schemes can be implemented on any storage system or device that is connected over an interface to a host and temporarily or permanently stores data for the host for later retrieval.

To assist in illustrating the present implementations, FIG. 1 shows a block diagram of a system including a storage device 100 coupled to a host 101 according to some implementations. In some examples, the host 101 can be a user device operated by a user. The host 101 may include an Operating System (OS), which is configured to provide a filesystem and applications which use the filesystem. The filesystem communicates with the storage device 100 (e.g., a controller 110 of the storage device 100) over a suitable wired or wireless communication link or network to manage storage of data in the storage device 100.

In that regard, the filesystem of the host 101 sends data to and receives data from the storage device 100 using a suitable interface 140 to the communication link or network. The interface 140 allows the software (e.g., the filesystem) of the host 101 to communicate with the storage device 100 (e.g., the controller 110). The storage device 100 (e.g., the controller 110) is operatively coupled to a PCIe bus of the host 101 directly via the interface 140. While the interface 140 is conceptually shown as a dashed line between the host 101 and the storage device 100, the interface can include one or more controllers, one or more namespaces, ports, transport mechanism, and connectivity thereof. To send and receive data, the software or filesystem of the host 101 communicates with the storage device using a storage data transfer protocol running on the interface. Examples of the protocol include but is not limited to, the SAS, SATA and NVMe protocols. The interface 140 includes hardware (e.g., controllers) implemented on the host 101, the storage device 100 (e.g., the controller 110), or another device operatively coupled to the host 101 and/or the storage device 100 via one or more suitable networks. The interface 140 and the storage protocol running thereon also includes software and/or firmware executed on the hardware.

In some examples, the storage device 100 is located in a datacenter (not shown for brevity). The datacenter may include one or more platforms, each of which supports one or more storage devices (such as but not limited to, the storage device 100). In some implementations, the storage devices within a platform are connected to a Top of Rack (TOR) switch and can communicate with each other via the TOR switch or another suitable intra-platform communication mechanism. In some implementations, at least one router may facilitate communications among the storage devices in different platforms, racks, or cabinets via a suitable networking fabric. Examples of the storage device 100 include non-volatile devices such as but are not limited to, a Solid State Drive (SSD), a Non-Volatile Dual In-line Memory Module (NVDIMM), a Universal Flash Storage (UFS), a Secure Digital (SD) device, and so on.

The storage device 100 includes at least a controller 110 and a memory array 120. Other components of the storage device 100 are not shown for brevity. The memory array 120 includes NAND flash memory devices 130a-130n. Each of the NAND flash memory devices 130a-130n includes one or more individual NAND flash dies, which are NVM capable of retaining data without power. Thus, the NAND flash memory devices 130a-130n refer to multiple NAND flash memory devices or dies within the flash memory device 100. Each of the NAND flash memory devices 130a-130n includes one or more dies, each of which has one or more planes. Each plane has multiple blocks, and each block has multiple pages.

While the NAND flash memory devices 130a-130n are shown to be examples of the memory array 120, other examples of non-volatile memory technologies for implementing the memory array 120 include but are not limited to, Dynamic Random Access Memory (DRAM), Magnetic Random Access Memory (MRAM), Phase Change Memory (PCM), Ferro-Electric RAM (FeRAM), and so on. The arrangements described herein can be likewise implemented on memory systems using such memory technologies and other suitable memory technologies.

Examples of the controller 110 include but are not limited to, an SSD controller (e.g., a client SSD controller, a datacenter SSD controller, an enterprise SSD controller, and so on), a UFS controller, or an SD controller, and so on.

The controller 110 can combine raw data storage in the plurality of NAND flash memory devices 130a-130n such that those NAND flash memory devices 130a-130n function as a single storage. The controller 110 can include processors, microcontrollers, buffers (e.g., buffer 112), error correction systems, data encryption systems, Flash Translation Layer (FTL) and flash interface modules. Such functions can be implemented in hardware, software, and firmware or any combination thereof. In some arrangements, the software/firmware of the controller 110 can be stored in the memory array 120 or in any other suitable computer readable storage medium.

The controller 110 includes suitable processing and memory capabilities for executing functions described herein, among other functions. As described, the controller 110 manages various features for the NAND flash memory devices 130a-130n including but not limited to, I/O handling, reading, writing/programming, erasing, monitoring, logging, error handling, garbage collection, wear leveling, logical to physical address mapping, data protection (encryption/decryption), and the like. Thus, the controller 110 provides visibility to the NAND flash memory devices 130a-130n.

As shown, the controller 110 includes a buffer 112 (a drive buffer). The buffer 112 is a local memory of the controller 110. In some examples, the buffer 112 is a volatile storage. In some examples, the buffer 112 is a non-volatile persistent storage. Examples of the buffer 112 include but are not limited to, RAM, DRAM, Static RAM (SRAM), Magnetic RAM (MRAM), Phase Change Memory (PCM) and so on. The buffer 112 may refer to multiple buffers each configured to store data of a different type. The different types of data include new data received from the host 101 to be written to the memory array 120, transient XOR data received from the host 101, old data read from the memory array 120, saved data read from the memory array 120, XOR results, and so on.

In one example, in response to receiving data (e.g., new data, transient XOR data, and so on) from the host 101 (via the host interface 140), the controller 110 acknowledges the write commands to the host 101 after writing the data to the buffer 112. The controller 110 can write the data stored in the buffer 112 to the memory array 120 (e.g., the NAND flash memory devices 130a-130n). Once writing the data to physical addresses of the memory array 120 is complete, the FTL updates mapping between logical addresses used by the host to associate with the data and the physical addresses used by the controller to identify the physical locations of the data. In another example, the buffer 112 can also store data read from the memory array 120.

The host 101 includes a buffer 102 (e.g., a host buffer). The buffer 102 is a local memory of the host 101. In some examples, the buffer 102 is a volatile storage. Examples of the buffer 102 include but are not limited to, RAM, DRAM, SRAM, and so on. The buffer 102 may refer to multiple buffers each configured to store data of a different type. The different types of data include new data to be sent to the storage device 100, transient XOR data to be sent to the storage device 100, previous data to be sent to the storage device 100, and so on.

While non-volatile memory devices (e.g., the NAND flash memory devices 130a-130n) are presented as examples herein, the disclosed schemes can be implemented on any storage system or device that is connected to the host 101 over an interface, where such system temporarily or permanently stores data for the host 101 for later retrieval.

In some arrangements, the host 101 coordinates with the storage device 100 in performing the XOR computations not only for the parity data reads and writes, but also for non-parity data reads and writes. In particular, the storage device 100 (e.g., the controller 110) can be configured to perform the XOR computations instead of receiving the XOR results from the host 101. Thus, the host 101 does not need to consume additional memory resources for such operations, does not need to consume CPU cycles to send additional commands for performing the XOR computations, does not need to allocate hardware resources for related Direct Memory Access (DMA) transfers, does not need to consume submission and completion queues for additional commands, and does not need to consume additional bus/network bandwidth.

Given that the improvements gained in having the storage device 100 perform the XOR computation internally within the storage device 100, not only does the overall system cost (for the system include the host 101 and the storage device 100) become lower but also the system performance is improved. Thus, as compared to conventional RAID redundancy mechanisms, the present disclose relates to allowing the storage device 100 to offload functionality and repartition of functionality, resulting in fewer operations and less data movement.

In some arrangements, the XOR computation can be performed within the controller 110 and over the interface 140 (e.g., the NVMe interface) to update parity data stored in the memory array 120. The storage device 100 is a parity drive.

Traditionally, to update parity data (or parity) on a parity drive in a RAID 5 group, the following steps are performed. The host 101 submits a NVMe read request over the interface 140 to the controller 110. In response, the controller 110 performs a NAND read into a drive buffer. In other words, the controller 110 reads the data (old, existing parity data) requested in the read request from the memory array 120 (one or more of the NAND flash memory devices 130a-130n) and stores the data in the buffer 112. The controller 110 transfers the data from the buffer 112 across the interface 140 into the buffer 102 (e.g., an old data buffer). The old data buffer of the host 101 therefore stores the old data read from the memory array 120. The host 101 then performs an XOR operation between (i) data that the host 101 has already computed earlier (referred to as transient XOR data) and residing in the buffer 102 (e.g., a trans-XOR buffer) and (ii) the old data read from the memory array 120 and stored in the old data buffer of the host 101. The result (referred to as new data) is then stored in the buffer 102 (e.g., a new data buffer). In some cases, the new data buffer can potentially be the same as either the old data buffer or the trans-XOR buffer, as the new data can replace existing contents in those buffers, to conserve memory resources. The host 101 then submits a NVMe write request to the controller 110 and presents the new data from the new data buffer to the controller 110. In response, controller 110 then performs a data transfer to obtain the new data from the new data buffer of the host 101 across the interface 140, and stores the new data into the drive buffer 112. The controller 110 then updates the old, existing data by writing the new data into the memory array 120 (e.g., one or more of the NAND flash memory devices 130a-130n). The new data and the old data share the same logical address (e.g., the same Logical Block Address (LBA)) and have different physical addresses (e.g., stored in different NAND pages of the NAND flash memory devices 130a-130n), due to the nature of operation of NAND flash memory. The controller 110 also updates a logical to physical mapping table to take note of the new physical address.

Figures 2A, 2B:
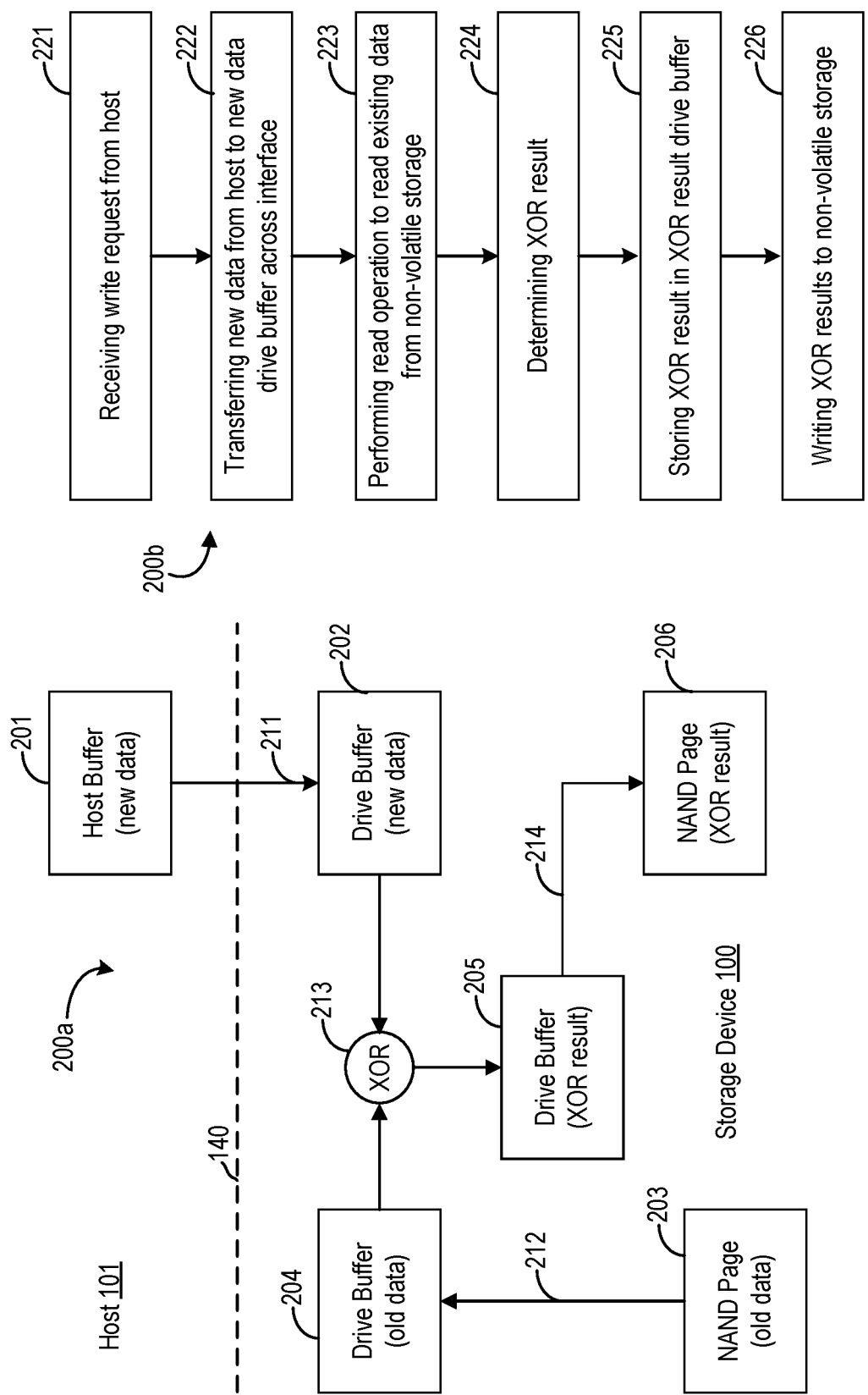
FIG. 2A is a block diagram illustrating an example method for performing parity update, according to some implementations.
FIG. 2B is a flowchart diagram illustrating an example method for performing parity update, according to some implementations.

On the other hand, FIG. 2A is a block diagram illustrating an example method 200a for performing parity update, according to some implementations. Referring to FIGS. 1-2A, the method 200a provides improved Input/Output (I/O) efficiency, host CPU efficiency, memory resource efficiency, and data transfer efficiency as compared to the conventional parity update method noted above. The method 200a can be performed by the host 101 and the storage device 100. Communication (e.g., of data and commands) between the host 101 and the storage device 100 can be performed over the interface 140.

In FIG. 2A, the blocks and processes shown above the dashed line representing the interface 140 relate to the host 101 while the blocks and processes shown below the dashed line relate to the storage device 100. A host buffer (new data) 201 is a particular implementation of the buffer 102. The NAND page (old data) 203 and the NAND page (XOR result) 206 are different pages in the NAND flash memory devices 130a-130n.

In the method 200a, the host 101 submits a NVMe write request over the interface 140 to the controller 110, at 211. The host 101 presents to the controller 110 the host buffer (new data) 201 to be written. In response, the controller 110 performs a data transfer to obtain the new data (parity data) from the host buffer (new data) 201 across the interface 140, and stores the new data into the drive buffer (new data) 202. The write request includes a logical address (e.g., LBA) of the new data.

The controller 110 performs a NAND read into a drive buffer (old data) 204, at 212. In other words, the controller 110 reads the old and existing data corresponding to the logical address in the read request from the memory array 120 (e.g., one or more NAND pages (old data) 203 and stores the old data in the drive buffer (old data) 204. The one or more NAND pages (old data) 203 are pages in one or more of the NAND flash memory devices 130a-130n. The new data and the old data are parity data (e.g., one or more parity bit). In other words, the old data (old parity data) is updated to the new data (new parity data).

The controller 110 performs an XOR operation between new data stored in the drive buffer (new data) 202 and the old data stored in the drive buffer (old data) 204 to determine an XOR result, and stores the XOR result in the drive buffer (XOR result) 205, at 213. In some arrangements, the drive buffer (new data) 202, the drive buffer (old data) 204, and the drive buffer (XOR result) 205 are separate buffers and particular implementations of the buffer 112. In other arrangements, to conserve memory resources, the drive buffer (XOR result) 205 can be the same as the drive buffer (old data) 204 or the drive buffer (new data) 202, such that the XOR results can be written over the content of the drive buffer (old data) 204 or the drive buffer (new data) 202.

At 214, the controller 110 then updates the old data with the new data by writing the XOR result into a NAND page (XOR result) 206. The controller 110 (e.g., the FTL) updates a logical to physical addressing mapping table to correspond the physical address of the NAND page (XOR result) 206 with the logical address. The controller 110 marks the physical address of the NAND page (old data) 203 for garbage collection.

FIG. 2B is a flowchart diagram illustrating an example method 200b for performing parity update, according to some implementations. Referring to FIGS. 1-2B, the method 200b corresponds to the method 200a. The method 200b can be performed by the controller 110 of the storage device 100.

At 221, the controller 110 receives a write request from the host 101 operatively coupled to the storage device 100. At 222, in response to receiving the write request, the controller 110 transfers the new data (new parity data) from the host 101 (e.g., from the host buffer (new data) 201) to a new data drive buffer (e.g., the drive buffer (new data) 202) across the interface 140. Thus, the controller 110 receives the new data corresponding to the logical address identified in the write request from the host 101. At 223, the controller 110 performs a read operation to read the existing (old) data (existing, old parity data) from a non-volatile storage (e.g., from the NAND page (old data) 203) into an existing data drive buffer (e.g., the drive buffer (old data) 204).

At 224, the controller 110 determines an XOR result by performing an XOR operation of the new data and the existing data. At 225, the controller 110 temporarily stores the XOR result in an XOR result drive buffer (e.g., the drive buffer (XOR result) 205) after determining the XOR result. At 226, the controller 110 writes the XOR result stored in the XOR result drive buffer to the non-volatile storage (e.g., the NAND page (XOR result) 206). As noted, the new data and the existing data correspond to a same logical address. The existing data is at a first physical address of the non-volatile storage (e.g., at the NAND page (old data) 204). Writing the XOR result to the non-volatile storage includes writing the XOR result to a second physical address of the non-volatile storage (e.g., at the NAND page (XOR result) 206) and updating Logic-to-Physical (L2P) mapping to correspond the logical address to the second physical address.

The methods 200a and 200b improve upon the conventional parity data update method by executing the XOR operation in the drive hardware (e.g., in the hardware of the storage device 100 as noted), to completely obviate any need for the XOR operation at host level. The method 200a and 200b improve I/O efficiency, host CPU efficiency, memory resource efficiency, and data transfer efficiency as compared to the conventional parity update method.

With regard to I/O performance efficiency, the host 101 needs to submit only one request (the write request at 211 and 221) instead of two requests to update the parity data. In some examples, the work involved for each request includes: 1) the host 101 writes a command into a submission queue; 2) the host 101 writes updated submission queue tail pointer into a doorbell register; 3) the storage device 100 (e.g., the controller 110) fetches the command from the submission queue; 4) the storage device 100 (e.g., the controller 110) processes the command; 5) the storage device 100 (e.g., the controller 110) writes details about the status of completion into a completion queue; 6) the storage device 100 (e.g., the controller 110) informs the host 101 that the command has completed; 7) the host 101 processes the completion; and 8) the host 101 writes the updated completion queue head pointer to doorbell register.

Accordingly, the host 101 does not need to read the existing parity data and perform the XOR of transient XOR data and the existing parity data. The mechanisms disclosed herein consume close to 10% of the total elapsed time to fetch 4 KB of data from the storage device 100, excluding all of the time elapsed within the storage device 100 to fetch the command, process the command, fetch the data from the storage media (e.g., the memory array 120), and complete the XOR operations. Hence, the present arrangements can reduce number of host requests by half (from two to one), representing significant efficiency improvements.

With regard to host CPU efficiency, the host computation is more expensive than computation of the storage device 100, as the cost of host CPU is significantly higher than CPU of the storage device 100. Consequently, saving computation cycles for the host CPU results in greater efficiency. Studies have estimated that number of CPU clocks per NVMe request required are approximately 34,000. Thus, as each time a parity update needs to be performed, the CPU savings of 34,000 clocks occurs. For comparison purposes, a 12 Gb SAS interface request for an SSD consumes approximately 79,000 clocks per request. With NVMe interface technology, this requirement can be reduced to approximately 34,000—a savings of about 45,000 clock cycles. Considering the elimination for XOR computation at the host level along with the reduction in requests, the efficiency improvement can be compared to the efficiencies provided by the NVMe interface over a SAS interface.

With regard to memory resource efficiency, in addition to savings for the host 101 at the CPU level, there are also savings to be gained in terms of memory consumption. DRAM memory continues to be a precious resource for the host 101, not only because only a limited amount can be added to the host 101 due to limited Dual In-line Memory Module (DIMM) slots but also due to capacity scaling limitations of the DRAM technology itself. In addition, modern applications such as machine learning, in-memory databases, big data analytics increase the need for additional memory at the host 101. Consequently, a new class of devices known as Storage Class Memory (SCM) has emerged to bridge the gap given that DRAM is unable to fill this increased memory need. While this technology is still in its infancy, a vast majority of existing systems are still looking for solutions that can help reduce consumption of memory resources without compromising on other attributes such as cost or performance. The present arrangements reduce memory consumption by eliminating the need to potentially allocate up to two buffers in the host 101 (a savings of up to 200% per request), thus reducing cost.

With regard to data transfer efficiency, a number of data transfers across the NVMe interface for the data copies from a drive buffer (e.g., the buffer 112) to a host buffer (e.g., the buffer 102) can be reduced by half, which reduces consumption of sought-after hardware resources for DMA transfers and the utilization of the PCIe bus/network. This reduction in resources not only reduces power consumption but also improves performance.

In some arrangements, the XOR computation can be performed within the controller 110 and over the interface 140 (e.g., the NVMe interface) to update data stored in the memory array 120. The storage device 100 is a data drive.

Traditionally, to update data (regular, non-parity data) on a data drive in a RAID 5 group, the following steps are performed. The host 101 submits a NVMe read request over the interface 140 to the controller 110. In response, the controller 110 performs a NAND read into a drive buffer. In other words, the controller 110 reads the data requested in the read request from the memory array 120 (one or more of the NAND flash memory devices 130a-130n) and stores it in the buffer 112. The controller 110 transfers the data from the buffer 112 across the interface 140 into the buffer 102 (e.g., an old data buffer). The old data buffer of the host 101 therefore stores the old data read from the memory array 120. The host 101 then submits a NVMe write request to the controller 110 and presents new data in a new data buffer of the host 101 to be written by the controller 110. In response, the controller 110 performs a data transfer to transfer the new data from the new data buffer of the host 101 across the NVMe interface into the drive buffer (e.g., the buffer 112). The controller 110 then updates the old, existing data by writing the new data into the memory array 120 (e.g., one or more of the NAND flash memory devices 130a-130n). The new data and the old data share the same logical address (e.g., LBA) and have different physical addresses (e.g., stored in different NAND pages of the NAND flash memory devices 130a-130n). The host 101 then performs an XOR operation between (i) the new data that is already residing in the new data buffer of the host 101 and (ii) existing data read from the storage device 100 and residing in the old data buffer of the host 101. The host 101 stores the result of the XOR operation (referred to as transient XOR data) in a trans-XOR host buffer of the host 101. In some cases, the trans-XOR buffer can potentially be the same as either the old data buffer or the new data buffer, as the transient XOR data can replace existing contents in those buffers, to conserve memory resources.

On the other hand, FIG. 3A is a block diagram illustrating an example method 300a for performing data update, according to some implementations. Referring to FIGS. 1-3A, similar to the methods 200a and 200b, the method 300a provides improved I/O efficiency, host CPU efficiency, and memory resource efficiency as compared to the conventional data update method noted above. The method 300a can be performed by the host 101 and the storage device 100. Communication (e.g., of data and commands) between the host 101 and the storage device 100 can be performed over the interface 140.

In FIG. 3A, the blocks and processes shown above the dashed line representing the interface 140 relate to the host 101 while the blocks and processes shown below the dashed line relate to the storage device 100. The buffer 102 include a host buffer (new data) 301 and a host buffer (trans-XOR) 307. The NAND page (old data) 303 and the NAND page (new data) 305 are different pages in the NAND flash memory devices 130a-130n.

In the method 300a, the host 101 submits a NVMe write request over the interface 140 to the controller 110, at 311. The host 101 to the controller 110 presents the host buffer (new data) 301 to be written. In response, the controller 110 performs a data transfer to obtain the new data (regular, non-parity data) from the host buffer (new data) 301 across the interface 140, and stores the new data into the drive buffer (new data) 302. The write request includes a logical address (e.g., LBA) of the new data.

The controller 110 performs a NAND read into a drive buffer (old data) 304, at 312. In other words, the controller 110 reads the old and existing data corresponding to the logical address in the read request from the memory array 120 (e.g., one or more NAND pages (old data) 303 and stores the old data in the drive buffer (old data) 304. The one or more NAND pages (old data) 303 are pages in one or more of the NAND flash memory devices 130a-130n. The new data and the old data are data (e.g., regular, non-parity data). In other words, the old data is updated to the new data.

At 313, the controller 110 then updates the old data with the new data by writing the new data from the drive buffer (new data) 302 into a NAND page (new data) 305. The controller 110 (e.g., the FTL) updates the addressing mapping table to correspond the physical address of the NAND page (new data) 305 with the logical address. The controller 110 marks the physical address of the NAND page (old data) 303 for garbage collection.

At 314, the controller 110 performs an XOR operation between new data stored in the drive buffer (new data) 302 and the old data stored in the drive buffer (old data) 304 to determine a transient XOR result, and stores the transient XOR result in the drive buffer (trans-XOR) 306. In some arrangements, the drive buffer (new data) 302, the drive buffer (old data) 304, and the drive buffer (trans-XOR) 306 are separate buffers and particular implementations of the buffer 112. In other arrangements, to conserve memory resources, the drive buffer (trans-XOR) 306 can be the same as the drive buffer (old data) 304 or the drive buffer (new data) 302, such that the transient XOR results can be written over the content of the drive buffer (old data) 304 or the drive buffer (new data) 302.

At 315, the controller 110 transfers the transient XOR result from the drive buffer (trans-XOR) 306 across the interface 140 into the host buffer (trans-XOR) 307. For example, the host 101 can submit a NVMe read request to the controller 110 for the transient XOR result, and the controller 110 transfers the transient XOR result from the drive buffer (trans-XOR) 306 across the interface 140 into the host buffer (trans-XOR) 307 as a response.

FIG. 3B is a flowchart diagram illustrating an example method 300b for performing data update, according to some implementations. Referring to FIGS. 1, 2A, and 3B, the method 300b corresponds to the method 300a. The method 300b can be performed by the controller 110 of the storage device 100.

At 321, the controller 110 receives a write request from the host 101 operatively coupled to the storage device 100. At 322, in response to receiving the write request, the controller 110 transfers the new data (new regular, non-parity data) from the host 101 (e.g., from the host buffer (new data) 301) to a new data drive buffer (e.g., the drive buffer (new data) 302) of the storage device 100 across the interface 140. Thus, the controller 110 receives the new data corresponding to the logical address identified in the write request from the host 101. At 323, the controller 110 performs a read operation to read the existing (old) data from a non-volatile storage (e.g., from the NAND page (old data) 303) into an existing data drive buffer (e.g., the drive buffer (old data) 304). The existing data has the same logical address as the new data, as identified in the write request.

At 324, the controller 110 writes the new data stored in the new data drive buffer of the storage device 100 to the non-volatile storage (e.g., the NAND page (new data) 305). As noted, the new data and the existing data correspond to the same logical address. The existing data is at a first physical address of the non-volatile storage (e.g., at the NAND page (old data) 303). Writing the new data to the non-volatile storage includes writing the new data to a second physical address of the non-volatile storage (e.g., at the NAND page (new data) 305) and updating L2P mapping to correspond the logical address to the second physical address. Blocks 323 and 324 can be performed in any suitable order or simultaneously.

At 325, the controller 110 determines an XOR result by performing an XOR operation of the new data and the existing data. The XOR result is referred to as a transient XOR result. At 326, the controller 110 temporarily stores the transient XOR result in an transient XOR result drive buffer (e.g., the drive buffer (trans-XOR) 306) after determining the transient XOR result. At 327, the controller 110 transfers the transient XOR result from the transient XOR result drive buffer to the host 101 (e.g., to the host buffer (trans-XOR) 307) across the interface 140.

Given that updating data on a data drive (e.g., the methods 300a and 300b) is followed by a corresponding update of parity on the parity drive (e.g., the methods 200a and 200b) to uphold integrity of the RAID 5 group protection, the efficiency is in reality a sum of both processes. In other words, every write in the conventional mechanism causes four I/O operations (read old data, read old parity, write new data, and write new parity). In the mechanism described herein, the number of I/O operations is reduced by half, to two (write new data, write new parity).

In some arrangements, the XOR computation can be performed within the controller 110 and over the interface 140 (e.g., the NVMe interface) to recover data of a failed device in a RAID 5 group.

Traditionally, to recover data from a failed device in a RAID 5 group, the following steps are performed. The host 101 submits a NVMe read request over the interface 140 to the controller 110 of a first storage device of a series of storage devices of a RAID 5 group. In the RAID 5 group, the nth storage device is the failed device, and the first storage device to the (n−1)th storage device are functional devices. Each storage device in the RAID 5 group can be a storage device such as but not limited to, the storage device 100. In response, the controller 110 of the first storage device performs a NAND read into a drive buffer of the first storage device. In other words, the controller 110 reads the data requested in the read request from the memory array 120 (one or more of the NAND flash memory devices 130a-130n) of the first storage device and stores the data in the buffer 112 of the first storage device. The controller 110 of the first storage device transfers the data from the buffer 112 of the first storage device across the interface 140 into the buffer 102 (e.g., a previous data buffer) of the host 101.

Next, the host 101 submits a NVMe read request over the interface 140 to the controller 110 of a second storage device of the RAID 5 group. In response, the controller 110 of the second storage device performs a NAND read into a drive buffer of the second storage device. In other words, the controller 110 of the second storage device reads the data requested in the read request from the memory array 120 (one or more of the NAND flash memory devices 130a-130n) of the second storage device and stores the data in the buffer 112 of the second storage device. The controller 110 of the second storage device transfers the data from the buffer 112 of the second storage device across the interface 140 into the buffer 102 (e.g., a current data buffer) of the host 101. The host 101 then performs an XOR operation between (i) the data in the previous data buffer of the host 101 and (ii) the data in current data buffer of the host 101. The result (a transient XOR result) is then stored in a trans-XOR buffer of the host 101. In some cases, the trans-XOR buffer of the host 101 can potentially be the same as either the previous data buffer or the current data buffer, as the transient XOR data can replace existing contents in those buffers, to conserve memory resources.

Next, the host 101 submits a NVMe read request over the interface 140 to the controller 110 of a next storage device of the RAID 5 group to read the current data of the next storage device in the manner described with the second storage device. The host 101 then performs the XOR operation between (i) the data in the previous data buffer, which is the transient XOR result determined in the previous iteration involving a previous storage device and (ii) the current data of the next storage device. Such processes are repeated until the host 101 determines the recovered data by performing an XOR operation between the current data of the (n−1)th storage device and the transient XOR result determined in the previous iteration involving the (n−2)th storage device.

On the other hand, FIG. 4A is a block diagram illustrating an example method 400a for performing data recovery, according to some implementations. Referring to FIGS. 1 and 4A, similar to the methods 200a and 200b, the method 400a provides improved host CPU efficiency and memory resource efficiency as compared to the conventional data update method noted above. The method 400a can be performed by the host 101 and the storage device 100. Communication (e.g., of data and commands) between the host 101 and the storage device 100 can be performed over the interface 140.

In FIG. 4A, the blocks and processes shown above the dashed line representing the interface 140 relate to the host 101 while the blocks and processes shown below the dashed line relate to the storage device 100. The buffer 102 include a host buffer (previous data) 401 and a host buffer (trans-XOR) 406. The NAND page (saved data) 403 refers to one or more pages in the NAND flash memory devices 130a-130n.

FIG. 4A shows one iteration of recovery data for a failed, nth device in a RAID 5 group. Each storage device in the RAID 5 group can be a storage device such as but not limited to, the storage device 100. With regard to the first storage device in the RAID 5 group, the host 101 submits a NVMe read request for a logical address over the interface 140 to the controller 110 of the first storage device of the RAID 5 group. In response, the controller 110 of the first storage device performs a NAND read into a drive buffer of the first storage device. In other words, the controller 110 reads the beginning data corresponding to the logical address requested in the read request from the memory array 120 (one or more of the NAND flash memory devices 130a-130n) of the first storage device and stores the beginning data in the buffer 112 of the first storage device. The controller 110 of the first storage device transfers the beginning data from the buffer 112 of the first storage device across the interface 140 into the buffer 102 (e.g., a host buffer (previous data) 401) of the host 101.

The method 400a can be performed by one of the second to the (n−1)th storage devices in the RAID 5 group. The storage device performing the method 400a is referred to simply as the current storage device 100. The host 101 submits a NVMe read request over the interface 140 to the controller 110 of the current storage device 100, at 411. The host 101 presents the host buffer (previous data) 401 to the controller 110 to be written. In response, the controller 110 performs a data transfer to obtain the previous data from the host buffer (previous data) 401 across the interface 140, and stores the previous data into the drive buffer (new data) 402. The write request includes a logical address (e.g., LBA) of the previous data.

In the example in which the current storage device 100 is the second storage device of the RAID 5 group, the previous data is the beginning data obtained from the first storage device that is stored in the host buffer (previous data) 401. In the example in which the current storage device 100 is the third to the (n−1)th storage device, the previous data refers to the transient XOR data stored in the host buffer (trans-XOR) 406 of the previous storage device 100. The previous storage device is immediately before the current storage device in the RAID 5 group.

The controller 110 performs a NAND read into a drive buffer (saved data) 404, at 412. In other words, the controller 110 reads the saved data corresponding to the logical address in the read request from the memory array 120 (e.g., one or more NAND pages (saved data) 403 and stores the saved data in the drive buffer (saved data) 404. The one or more NAND pages (saved data) 403 are pages in one or more of the NAND flash memory devices 130a-130n.

At 413, the controller 110 performs an XOR operation between the previous data stored in the drive buffer (new data) 402 and the saved data stored in the drive buffer (saved data) 404 to determine a transient XOR result, and stores the transient XOR result in the drive buffer (trans-XOR) 405. In some arrangements, the drive buffer (new data) 402, the drive buffer (saved data) 404, and the drive buffer (trans-XOR) 405 are separate buffers and particular implementations of the buffer 112. In other arrangements, to conserve memory resources, the drive buffer (trans-XOR) 405 can be the same as the drive buffer (saved data) 404 or the drive buffer (new data) 402, such that the transient XOR results can be written over the content of the drive buffer (saved data) 404 or the drive buffer (new data) 402.

At 414, the controller 110 transfers the transient XOR result from the drive buffer (trans-XOR) 405 across the interface 140 into the host buffer (trans-XOR) 406. For example, the host 101 can submit a NVMe read request to the controller 110 for the transient XOR result, and the controller 110 transfers the transient XOR result from the drive buffer (trans-XOR) 405 across the interface 140 into the host buffer (trans-XOR) 406 as a response. The iteration for the current storage device 100 completes at this point, and the transient XOR result corresponds to the previous data for the next storage device after the current storage device, in a next iteration. In the case in which the current storage device is the (n−1) the storage device, the transient XOR result is in fact the recovered data for the failed nth storage device.

FIG. 4B is a flowchart diagram illustrating an example method 400b for performing data recovery, according to some implementations. Referring to FIGS. 1, 4A, and 4B, the method 400b corresponds to the method 400a. The method 400b can be performed by the controller 110 of the storage device 100.

At 421, the controller 110 receives a write request from the host 101 operatively coupled to the storage device 100. At 422, in response to receiving the write request, the controller 110 transfers the previous data from the host 101 (e.g., from the host buffer (new data) 401) to a new data drive buffer (e.g., the drive buffer (new data) 402) of the storage device 100 across the interface 140. Thus, the controller 110 receives the previous data corresponding to the logical address identified in the write request from the host 101. At 423, the controller 110 performs a read operation to read the existing (saved) data from a non-volatile storage (e.g., from the NAND page (saved data) 403) into an existing data drive buffer (e.g., the drive buffer (saved data) 404). The saved data has the same logical address as the previous data.

At 424, the controller 110 determines an XOR result by performing an XOR operation of the previous data and the saved data. The XOR result is referred to as a transient XOR result. At 425, the controller 110 temporarily stores the transient XOR result in an transient XOR result drive buffer (e.g., the drive buffer (trans-XOR) 405) after determining the transient XOR result. At 426, the controller 110 transfers the transient XOR result from the transient XOR result drive buffer to the host 101 (e.g., to the host buffer (trans-XOR) 406) across the interface 140.

In some arrangements, the XOR computation can be performed within the controller 110 and over the interface 140 (e.g., the NVMe interface) to bring a spare storage device in a RAID 5 group into service.

Traditionally, to bring a spare storage device in a RAID 5 group into service, the following steps are performed. The host 101 submits a NVMe read request over the interface 140 to the controller 110 of a first storage device of a series of storage devices of a RAID 5 group. In the RAID 5 group, the nth storage device is the spare device, and the first storage device to the (n−1)th storage device are currently functional devices. Each storage device in the RAID 5 group can be a storage device such as but not limited to, the storage device 100. In response, the controller 110 of the first storage device performs a NAND read into a drive buffer of the first storage device. In other words, the controller 110 reads the data requested in the read request from the memory array 120 (one or more of the NAND flash memory devices 130a-130n) of the first storage device and stores the data in the buffer 112 of the first storage device. The controller 110 of the first storage device transfers the data from the buffer 112 of the first storage device across the interface 140 into the buffer 102 (e.g., an previous data buffer) of the host 101.

Next, the host 101 submits a NVMe read request over the interface 140 to the controller 110 of a second storage device of the RAID 5 group. In response, the controller 110 of the second storage device performs a NAND read into a drive buffer of the second storage device. In other words, the controller 110 of the second storage device reads the data requested in the read request from the memory array 120 (one or more of the NAND flash memory devices 130a-130n) of the second storage device and stores the data in the buffer 112 of the second storage device. The controller 110 of the second storage device transfers the data from the buffer 112 of the second storage device across the interface 140 into the buffer 102 (e.g., a current data buffer) of the host 101. The host 101 then performs an XOR operation between (i) the data in the previous data buffer of the host 101 and (ii) the data in current data buffer of the host 101. The result (a transient XOR result) is then stored in a trans-XOR buffer of the host 101. In some cases, the trans-XOR buffer of the host 101 can potentially be the same as either the previous data buffer or the current data buffer, as the transient XOR data can replace existing contents in those buffers, to conserve memory resources.

Next, the host 101 submits a NVMe read request over the interface 140 to the controller 110 of a next storage device of the RAID 5 group to read the current data of the next storage device in the manner described with the second storage device. The host 101 then performs the XOR operation between (i) the data in the previous data buffer, which is the transient XOR result determined in the previous iteration involving a previous storage device and (ii) the current data of the next storage device. Such processes are repeated until the host 101 determines the recovered data by performing an XOR operation between the current data of the (n−1)th storage device and the transient XOR result determined in the previous iteration involving the (n−2)th storage device. The host 101 stores the recovered data in a recovered data buffer of the host 101.

The recovered data is to be written into the spare, nth storage device for that logical address. For example, the host 101 submits a NVMe write request to the nth device and presents the recovered data buffer of the host 101 to be written. In response, the nth storage device performs a data transfer to obtain the recovered data from the host 101 by transferring the recovered data from the recovered data buffer of the host 101 across the NVMe interface into a drive buffer of the nth storage device. The controller 110 of the nth storage device then updates the old data stored in the NAND pages of the nth-storage device with the recovered data by writing the recovered data from the drive buffer of the nth storage device into one or more new NAND pages. The controller 110 (e.g., the FTL) updates the addressing mapping table to correspond the physical address of the new NAND page with the logical address. The controller 110 marks the physical address of the NAND pages on which the old data had been stored for garbage collection.

Figures 5A, 5B:
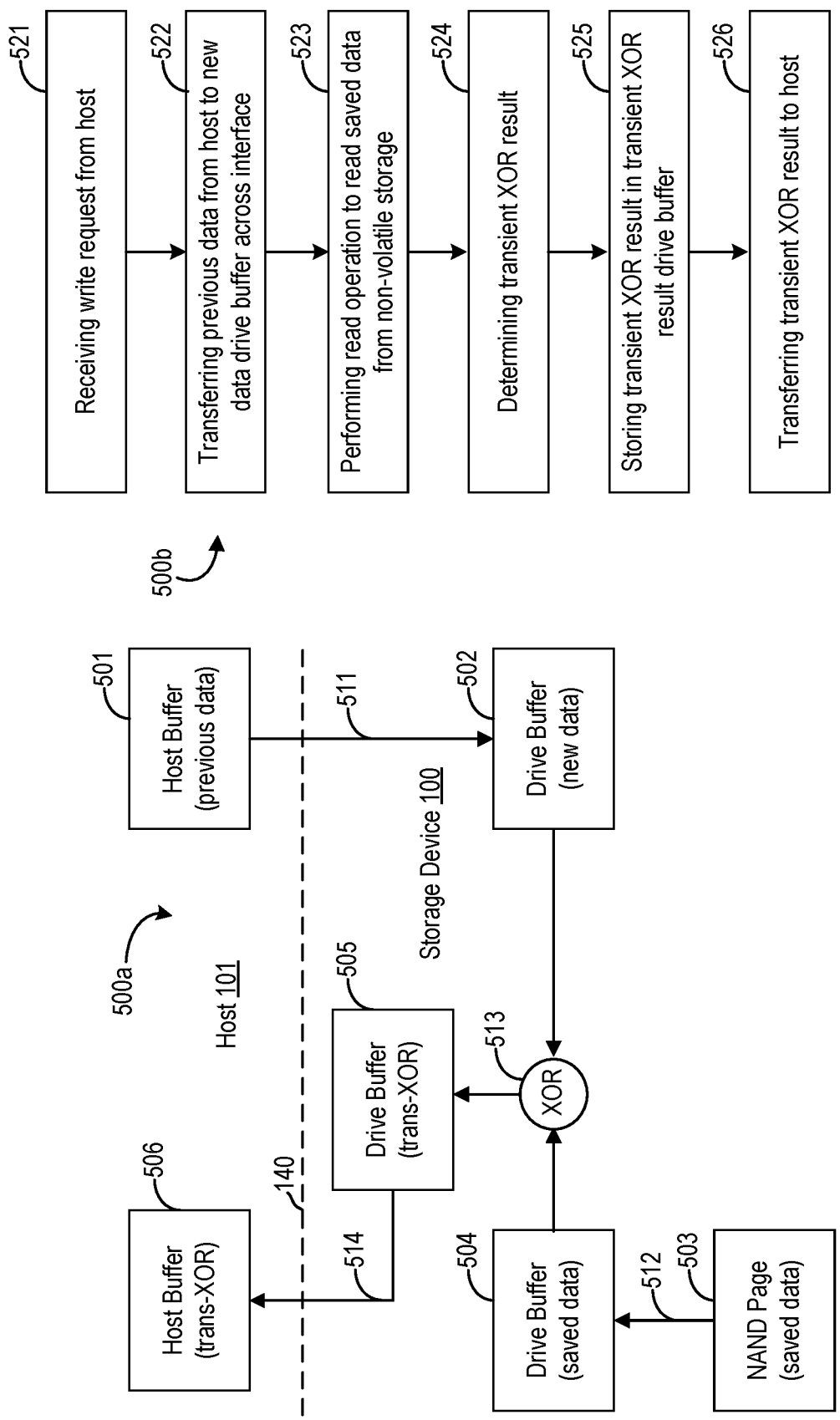
FIG. 5A is a block diagram illustrating an example method for bringing a spare storage device into service, according to some implementations.
FIG. 5B is a flowchart diagram illustrating an example method for bringing a spare storage device into service, according to some implementations.

On the other hand, FIG. 5A is a block diagram illustrating an example method 500a for bringing a spare storage device into service, according to some implementations. Referring to FIGS. 1 and 5A, similar to the methods 200a and 200b, the method 500a provides improved host CPU efficiency and memory resource efficiency as compared to the conventional data update method noted above. The method 500a can be performed by the host 101 and the storage device 100. Communication (e.g., of data and commands) between the host 101 and the storage device 100 can be performed over the interface 140.

In FIG. 5A, the blocks and processes shown above the dashed line representing the interface 140 relate to the host 101 while the blocks and processes shown below the dashed line relate to the storage device 100. The buffer 102 include a host buffer (previous data) 501 and a host buffer (trans-XOR) 506. The NAND page (saved data) 503 refers to one or more pages in the NAND flash memory devices 130a-130n.

FIG. 5A shows one iteration of bringing into service the spare, nth device in a RAID 5 group. Each storage device in the RAID 5 group can be a storage device such as but not limited to, the storage device 100. With regard to the first storage device in the RAID 5 group, the host 101 submits a NVMe read request for a logical address over the interface 140 to the controller 110 of the first storage device. In response, the controller 110 of the first storage device performs a NAND read into a drive buffer of the first storage device. In other words, the controller 110 reads the beginning data corresponding to the logical address requested in the read request from the memory array 120 (one or more of the NAND flash memory devices 130a-130n) of the first storage device and stores the beginning data in the buffer 112 of the first storage device. The controller 110 of the first storage device transfers the beginning data from the buffer 112 of the first storage device across the interface 140 into the buffer 102 (e.g., a host buffer (previous data) 504) of the host 101.

The method 500a can be performed by one of the second to the (n−1)th storage devices in the RAID 5 group. The storage device performing the method 500a is referred to simply as the current storage device 100. The host 101 submits a NVMe read request over the interface 140 to the controller 110 of the current storage device 100, at 511. The host 101 presents the host buffer (previous data) 501 to the controller 110 to be written. In response, the controller 110 performs a data transfer to obtain the previous data from the host buffer (previous data) 501 across the interface 140, and stores the previous data into the drive buffer (new data) 502. The write request includes a logical address (e.g., LBA) of the previous data.

In the example in which the current storage device 100 is the second storage device of the RAID 5 group, the previous data is the beginning data obtained from the first storage device that is stored in the host buffer (previous data) 501. In the example in which the current storage device 100 is the third to the (n−1)th storage device, the previous data refers to the transient XOR data stored in the host buffer (trans-XOR) 506 of the previous storage device 100. The previous storage device is immediately before the current storage device in the RAID 5 group.

The controller 110 performs a NAND read into a drive buffer (saved data) 504, at 512. In other words, the controller 110 reads the saved data corresponding to the logical address in the read request from the memory array 120 (e.g., one or more NAND pages (saved data) 503 and stores the saved data in the drive buffer (saved data) 504. The one or more NAND pages (saved data) 503 are pages in one or more of the NAND flash memory devices 130*a*-130*n*.

At 513, the controller 110 performs an XOR operation between the previous data stored in the drive buffer (new data) 502 and the saved data stored in the drive buffer (saved data) 504 to determine a transient XOR result, and stores the transient XOR result in the drive buffer (trans-XOR) 505. In some arrangements, the drive buffer (new data) 502, the drive buffer (saved data) 504, and the drive buffer (trans-XOR) 505 are separate buffers and particular implementations of the buffer 112. In other arrangements, to conserve memory resources, the drive buffer (trans-XOR) 505 can be the same as the drive buffer (saved data) 504 or the drive buffer (new data) 502, such that the transient XOR results can be written over the content of the drive buffer (saved data) 504 or the drive buffer (new data) 502.

At 514, the controller 110 transfers the transient XOR result from the drive buffer (trans-XOR) 505 across the interface 140 into the host buffer (trans-XOR) 506. For example, the host 101 can submit a NVMe read request to the controller 110 for the transient XOR result, and the controller 110 transfers the transient XOR result from the drive buffer (trans-XOR) 505 across the interface 140 into the host buffer (trans-XOR) 506 as a response. The iteration for the current storage device 100 completes at this point, and the transient XOR result corresponds to the previous data for the next storage device after the current storage device, in a next iteration. In the case in which the current storage device is the (n−1) the storage device, the transient XOR result is in fact the recovered data for the failed nth storage device.

FIG. 5B is a flowchart diagram illustrating an example method 500*b* for bringing a spare storage device into service, according to some implementations. Referring to FIGS. 1, 5A, and 5B, the method 500*b* corresponds to the method 500*a*. The method 500*b* can be performed by the controller 110 of the storage device 100.

At 521, the controller 110 receives a write request from the host 101 operatively coupled to the storage device 100. At 522, in response to receiving the write request, the controller 110 transfers the previous data from the host 101 (e.g., from the host buffer (new data) 501) to a new data drive buffer (e.g., the drive buffer (new data) 502) of the storage device 100 across the interface 140. Thus, the controller 110 receives the previous data corresponding to the logical address identified in the write request from the host 101. At 523, the controller 110 performs a read operation to read the existing (saved) data from a non-volatile storage (e.g., from the NAND page (saved data) 503) into an existing data drive buffer (e.g., the drive buffer (saved data) 504). The saved data has the same logical address as the previous data.

At 524, the controller 110 determines an XOR result by performing an XOR operation of the previous data and the saved data. The XOR result is referred to as a transient XOR result. At 525, the controller 110 temporarily stores the transient XOR result in an transient XOR result drive buffer (e.g., the drive buffer (trans-XOR) 505) after determining the transient XOR result. At 526, the controller 110 transfers the transient XOR result from the transient XOR result drive buffer to the host 101 (e.g., to the host buffer (trans-XOR) 506) across the interface 140.

Figure 6:
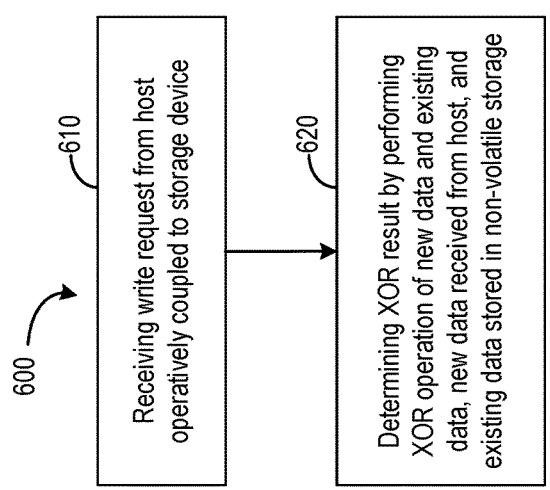
FIG. 6 is a process flow diagram illustrating an example method for providing data protection and recovery for drive failures, according to some implementations.

FIG. 6 is a process flow diagram illustrating an example method 600 for providing data protection and recovery for drive failures, according to some implementations. Referring to FIGS. 1-6, the method 600 is performed by the controller 110 of the storage device 100.

At 610, the controller 110 receives a write request from the host 101 operatively coupled to the storage device 100. The host 101 is operatively coupled to the storage device 100 through the interface 140. At 620, the controller 110 determines an XOR result by performing an XOR operation of new data and existing data. The new data is received from the host 101. The existing data is stored in the non-volatile storage (e.g., in the memory array 120).

In some arrangements, in response to receiving the write request, the controller 110 transfer the new data from the host 101 (e.g., from the buffer 102) to a new data drive buffer of the storage device 100 across the interface 140. The controller 110 performs a read operation to read the existing data from the non-volatile storage (e.g., in the memory array 120) into an existing data drive buffer.

As described with reference to updating parity data (e.g., the methods 200*a* and 200*b*), the controller 110 is further configured to store the XOR result in an XOR result drive buffer (e.g., the drive buffer (XOR result) 205) after being determined and write the XOR result to the non-volatile storage (e.g., to the NAND page (XOR result) 206). The new data and the existing (old) data correspond to a same logical address (same LBA). The existing data is at a first physical address of the non-volatile storage (e.g., the NAND page (old data) 203). The controller 110 writes the XOR result to the non-volatile storage includes writing the XOR result to a second physical address of the non-volatile storage (e.g., the NAND page (XOR result) 206) and updating the L2P mapping to correspond to the logical address to the second physical address. The existing data and the new data are parity bits.

As described with reference to updating regular, non-parity data (e.g., the methods 300*a* and 300*b*), the XOR result corresponds to a transient XOR result, and the controller 110 is further configured to transfer the transient XOR result from a transient XOR result drive buffer to the host 101 across the interface 104. The existing data and the new data are data bits. The new data and the existing (old) data correspond to a same logical address (same LBA). The existing data is at a first physical address of the non-volatile storage (e.g., the NAND page (old data) 303). The controller 110 writes the new data from the new data drive buffer to the non-volatile storage by writing the new data to a second physical address of the non-volatile storage (e.g., the NAND page (new data) 305) and updating the L2P mapping to correspond to the logical address to the second physical address.

As described with reference to performing data recovery (e.g., the methods 400*a* and 400*b*), the XOR result corresponds to a transient XOR result, and the controller 110 is further configured to transfer the XOR result from a transient XOR result drive buffer to the host 101 across the interface 140, to be transferred by the host 101 as previous data to another storage device. The another storage device is a next storage device after the storage device in a series of storage devices of a RAID group.

As described with reference to bringing a spare storage device into service (e.g., the methods 500*a* and 500*b*), the XOR result corresponds to a transient XOR result, and the controller 110 is further configured to transfer the XOR result from a transient XOR result drive buffer to the host 101 across the interface 140, to be transferred by the host 101 as recovered data to another storage device. The another storage device is the spare storage device being bought into service. The spare storage device is a next storage device after the storage device in a series of storage devices of a RAID group.

Figure 7:
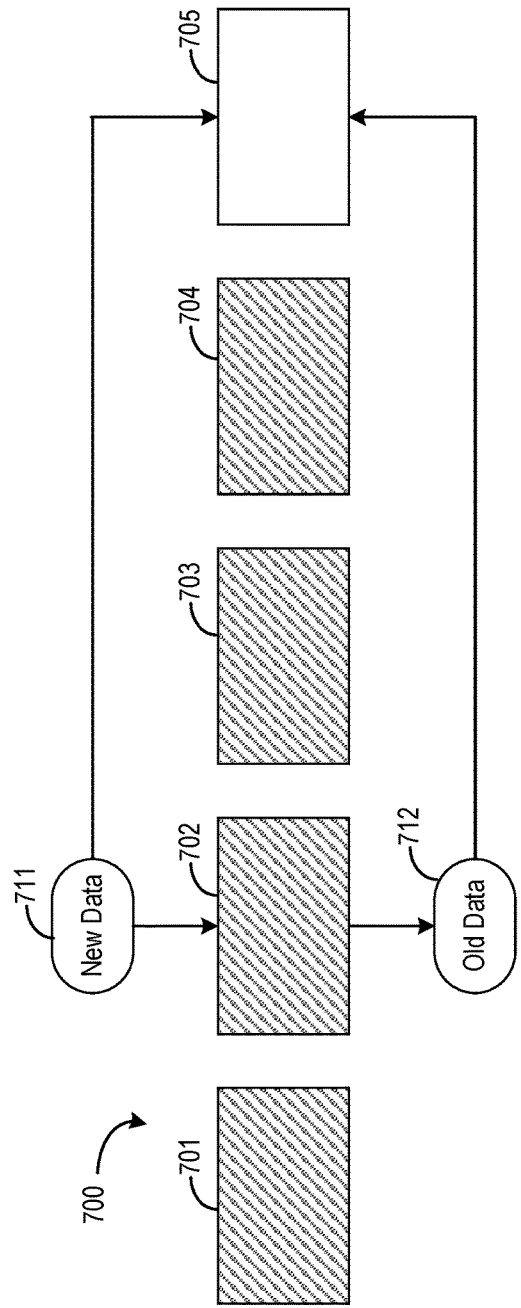
FIG. 7 is a schematic diagram illustrating a host-side view for updating data, according to some implementations.

FIG. 7 is a schematic diagram illustrating a host-side view 700 for updating data, according to some implementations. Referring to FIGS. 1-7, the filesystem of the host 101 includes logical blocks 701, 702, 703, 704, and 705. The logical blocks 701-704 contain regular, non-parity data. The logical block 705 contains parity data for the data in the logical blocks 701-704. As shown, in response to determining that new data 711 is to be written to logical block 702 (originally containing old data) in the storage device 100, instead of performing two XOR operations as done conventionally, the host 101 merely needs to update the logical block 705 to the new data 711. The controller 110 performs the XOR operations as described. Both the new data 711 and the old data 712 are appended to the parity data in logical block 705. In the next garbage collection (GC) cycle, the new parity data is compacted.

Figure 8:
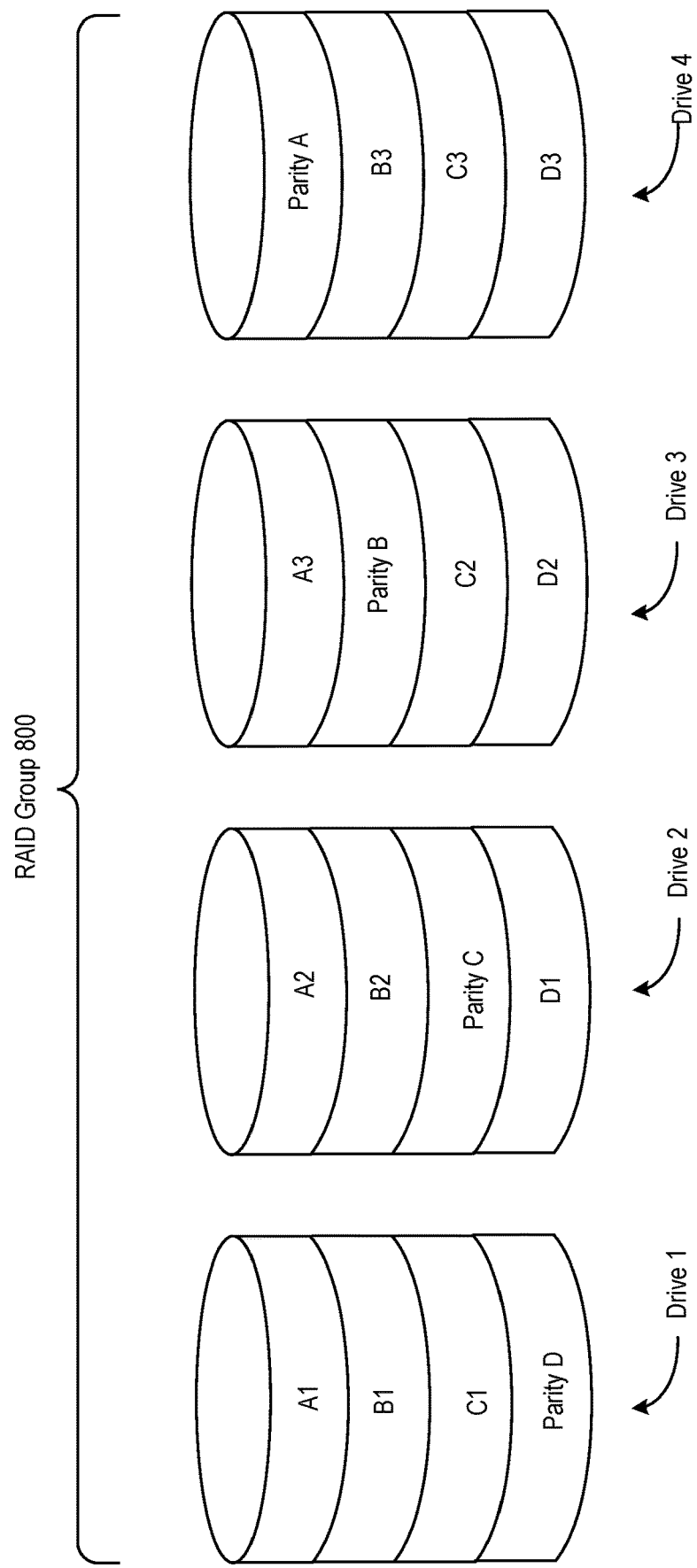
FIG. 8 is a schematic diagram illustrating a placement of parity data, according to some implementations.

FIG. 8 is a schematic diagram illustrating a placement of parity data, according to some implementations. Referring to FIGS. 1 and 8, a RAID group 800 (e.g., a RAID 5 group) includes four drives—Drive 1, Drive 2, Drive 3, an Drive 4. An example of each drive is the storage device 100. Each of the Drives 1-4 stores data and parity data in its respective memory array 120. Parity A is generated by XORing data A1, A2, and A3 and is stored on Drive 4. Parity B is generated by XORing data B1, B2, and B3 and is stored on Drive 3. Parity C is generated by XORing data C1, C2, and C3 and is stored on Drive 2. Parity D is generated by XORing data D1, D2, and D3 and is stored on Drive 1.

Conventionally, if A3 is to be modified (updated) to A3', the host 101 can read A1 from Drive 1 and A2 from Drive 2, and XOR A1, A2, and A3' to generate Parity A', and writes A3' to Drive 3 and Parity A' to Drive 4. Alternatively and also conventionally, in order to avoid having to re-read all the other drives (especially if there were more than four drives in the RAID group), the host 101 can also generate Parity A' by reading A3 from Drive 3, reading Parity A from Drive 4, and XORing A3, A3', and Parity A, and then writing A3' to Drive 3 and Parity A' to Drive 4. In both conventional cases, modifying A3 would require the host 101 to perform at least two reads from and two writes to drives.

The arrangements disclosed herein can eliminate the host 101 having to read Parity A by enabling the storage device 110 (e.g., the controller 110 thereof) to perform an XOR operation internally and generating Parity A' itself. In some examples, the storage device 110 can support a new Vendor Unique Command (VUC) to compute and store the results of an XOR operation.

The host 101 can send, to the storage device 110, a VUC which contains the LBAs for (1) data or parity data stored on the storage device 110, and (2) the data to be XORed with the data or the parity data corresponding to the LBAs. The storage device 110 can read the data or the parity data corresponding to the LBAs sent by the host 101. The read is an internal read, and the read data is not sent back to the host 101. The storage device 110 XORs the data sent by the host 101 with the data or the parity data which was internally read, stores the results of the XOR operation in the LBAs corresponding to the data or the parity data which had been read, and confirm successful command completion to the host 101. Such command can be executed in no more time than would be required for comparably sized read and write commands.

The host 101 can send a command to Drive 4 that includes the LBAs for Parity A and the result of XORing A3 and A3', and in response, Drive 4 computes and stores Parity A' in the same LBAs that previously contained Parity A.

In some examples, the XOR operations can be performed within the controller 110 via commands. The commands can be implemented over any interface used to communicate to a storage device. In some examples, the NVMe interface commands can be used. For example, the host 101 can send an XFER command (with indicated LBA) to the controller 110, to cause the controller 110 to perform a Computation Function (CF) on the data corresponding the indicated LBAs from the memory array 120. The type of CF to be performed, when the CF is to be performed, and on what data are CF-specific. For example, a CF operation can call for read data from the memory array 120 to be XORed with write data transferred from the host 101 before the data is written to the memory array 120.

CF operations are not performed on the metadata in some examples. The host 101 can specify protection information to include as part of the CF operations. In other examples, the XFER command causes the controller 110 to operate on data and metadata, as per CF specified for the logical blocks indicated in the command. The host 101 can likewise specify protection information to include as part of the CF operations.

In some arrangements, the host 101 can invoking a CF on data that is being sent to the storage device 100 (e.g., for a write operation) or requested from the storage device 100 (e.g., for a read operation). In some examples, the CF is applied before saving data to the memory array 120. In some examples, the CF is applied after saving data to the memory array 120. In some examples, the storage device 100 sends data to the host 101 after performing the CF. Examples of the CF includes the XOR operation as described herein, e.g., for RAID5.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout the previous description that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of steps in the processes disclosed is an example of illustrative approaches. Based upon design preferences, it is understood that the specific order or hierarchy of steps in the processes may be rearranged while remaining within the scope of the previous description. The accompanying method claims present elements of the various steps in a sample order, and are not meant to be limited to the specific order or hierarchy presented.

The previous description of the disclosed implementations is provided to enable any person skilled in the art to make or use the disclosed subject matter. Various modifications to these implementations will be readily apparent to those skilled in the art, and the generic principles defined herein may be applied to other implementations without departing from the spirit or scope of the previous description. Thus, the previous description is not intended to be limited to the implementations shown herein but is to be accorded the widest scope consistent with the principles and novel features disclosed herein.

The various examples illustrated and described are provided merely as examples to illustrate various features of the claims. However, features shown and described with respect to any given example are not necessarily limited to the associated example and may be used or combined with other examples that are shown and described. Further, the claims are not intended to be limited by any one example.

The foregoing method descriptions and the process flow diagrams are provided merely as illustrative examples and are not intended to require or imply that the steps of various examples must be performed in the order presented. As will be appreciated by one of skill in the art the order of steps in the foregoing examples may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the examples disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the examples disclosed herein may be implemented or performed with a general purpose processor, a DSP, an ASIC, an FPGA or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical drive storage, magnetic drive storage or other magnetic storages, or any other medium that may be used to store desired program code in the form of instructions or data structures and that may be accessed by a computer. Drive and disc, as used herein, includes compact disc (CD), laser disc, optical disc, digital versatile disc (DVD), floppy drive, and blu-ray disc where drives usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed examples is provided to enable any person skilled in the art to make or use the present disclosure. Various modifications to these examples will be readily apparent to those skilled in the art, and the generic principles defined herein may be applied to some examples without departing from the spirit or scope of the disclosure. Thus, the present disclosure is not intended to be limited to the examples shown herein but is to be accorded the widest scope consistent with the following claims and the principles and novel features disclosed herein.

What is claimed is:

1. A storage device, comprising:
   a non-volatile storage; and
   a controller configured to:
   receive a write request from a host operatively coupled to the storage device;
   determine an XOR result by performing an XOR operation of new data and existing data, the new data is received from the host, and the existing data is stored in the non-volatile storage; and buffer the new data, the existing data and the XOR result in respective buffers of the storage device.

2. The device of claim 1, wherein
in response to receiving the write request, the controller transfer the new data from the host to a new data drive buffer of the storage device across an interface; and
the controller performs a read operation to read the existing data from the non-volatile storage into an existing data drive buffer.

3. The device of claim 2, wherein the controller is further configured to:
store the XOR result in an XOR result drive buffer after being determined; and
write the XOR result to the non-volatile storage.

4. The device of claim 3, wherein
the new data and the existing data correspond to a same logical address;
the existing data is at a first physical address of the non-volatile storage; and
writing the XOR result to the non-volatile storage comprises:
writing the XOR result to a second physical address of the non-volatile storage; and
updating logic-to-physical mapping to correspond to the logical address to the second physical address.

5. The device of claim 3, wherein the existing data and the new data are parity bits.

6. The device of claim 2, wherein
the XOR result corresponds to a transient XOR result; and
the controller is further configured to transfer the transient XOR result from a transient XOR result drive buffer to the host across the interface and transfer the new data drive buffer to the non-volatile storage.

7. The device of claim 6, wherein the existing data and the new data are data bits.

8. The device of claim 6, wherein
the new data and the existing data correspond to a same logical address;
the existing data is at a first physical address of the non-volatile storage; and
the controller is further configured to write the new data from the new data drive buffer to the non-volatile storage by:
writing the new data to a second physical address of the non-volatile storage; and
updating logic-to-physical mapping to correspond to the logical address to the second physical address.

9. The device of claim 2, wherein
the XOR result corresponds to a transient XOR result; and
the controller is further configured to transfer the XOR result from a transient XOR result drive buffer to the host across the interface, to be transferred by the host as previous data to another storage device, the another storage device is a next storage device after the storage device in a series of storage devices.

10. The device of claim 2, wherein
the XOR result corresponds to a transient XOR result; and
the controller is further configured to transfer the XOR result from a transient XOR result drive buffer to the host across the interface, to be transferred by the host as recovered data to another storage device, the another storage device is a spare storage device being bought into service and the recovered data is stored by a controller of the another storage device in a non-volatile memory of the another storage device.

11. A method, comprising:
receiving, by a controller of a storage device comprising non-volatile storage operatively coupled to a host through an interface, a write request from the host;
determining, by the controller, an XOR result by performing an XOR operation of new data and existing data, the new data is received from the host, and the existing data is stored in the non-volatile storage; and
buffering the new data, the existing data and the XOR result in respective buffers of the storage device.

12. The method of claim 11, further comprising:
in response to receiving the write request, transferring the new data from the host to a new data drive buffer of the storage device across the interface; and
performing a read operation to read the existing data from the non-volatile storage into an existing data drive buffer.

13. A non-transitory computer-readable media comprising computer-readable instructions, such that, when executed, causes a processor to:
receive a write request from a host operatively coupled to a storage device comprising non-volatile storage;
determine an XOR result by performing an XOR operation of new data and existing data, the new data is received from the host, and the existing data is stored in the non-volatile storage, and
buffer the new data, the existing data and the XOR result in respective buffers of the storage device.

14. The non-transitory computer-readable media of claim 13, wherein the processor is further caused to:
transfer the new data from the host to a new data drive buffer of the storage device across an interface in response to receiving the write request; and
perform a read operation to read the existing data from the non-volatile storage into an existing data drive buffer.

15. The non-transitory computer-readable media of claim 14, wherein the processor is further caused to:
store the XOR result in an XOR result drive buffer after being determined; and
write the XOR result to the non-volatile storage.

16. The non-transitory computer-readable media of claim 15, wherein
the new data and the existing data correspond to a same logical address;
the existing data is at a first physical address of the non-volatile storage; and
writing the XOR result to the non-volatile storage comprises:
writing the XOR result to a second physical address of the non-volatile storage; and
updating logic-to-physical mapping to correspond to the logical address to the second physical address.

17. The non-transitory computer-readable media of claim 14, wherein
the XOR result corresponds to a transient XOR result; and
the processor is further caused to transfer the transient XOR result from a transient XOR result drive buffer to the host across the interface and transfer the new data drive buffer to the non-volatile storage.

18. The non-transitory computer-readable media of claim 17, wherein
the new data and the existing data correspond to a same logical address;
the existing data is at a first physical address of the non-volatile storage; and
writing the new data from the new data drive buffer to the non-volatile storage comprises:

writing the new data to a second physical address of the non-volatile storage; and updating logic-to-physical mapping to correspond to the logical address to the second physical address.

19. The non-transitory computer-readable media of claim 14, wherein the XOR result corresponds to a transient XOR result; and the processor is further caused to transfer the XOR result from a transient XOR result drive buffer to the host across the interface, to be transferred by the host as previous data to another storage device, the another storage device is a next storage device after the storage device in a series of storage devices.

20. The non-transitory computer-readable media of claim 14, wherein the processor is caused to perform a Computation Function (CF) in response to receiving a request from the host, an operation associated with the CF comprises the XOR operation.

* * * * *